(12) United States Patent
Pham et al.

(10) Patent No.: US 10,764,431 B1
(45) Date of Patent: Sep. 1, 2020

(54) METHOD FOR CONVERSION AND CLASSIFICATION OF DATA BASED ON CONTEXT

(71) Applicant: Capital One Services, LLC, McLean, VA (US)

(72) Inventors: Vincent Pham, Champaign, IL (US); Fardin Abdi Taghi Abad, Champaign, IL (US); Reza Farivar, Champaign, IL (US); Kate Key, Champaign, IL (US); Anh Truong, Champaign, IL (US); Jeremy Goodsitt, Champaign, IL (US); Austin Walters, Savoy, IL (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

(21) Appl. No.: 16/573,110

(22) Filed: Sep. 17, 2019

(51) Int. Cl.
*H04M 3/42* (2006.01)
*H04M 3/51* (2006.01)
*G06N 20/00* (2019.01)
*G10L 15/26* (2006.01)

(52) U.S. Cl.
CPC ........ *H04M 3/42221* (2013.01); *G06N 20/00* (2019.01); *G10L 15/265* (2013.01); *H04M 3/42042* (2013.01); *H04M 3/5166* (2013.01)

(58) Field of Classification Search
CPC ........... H04M 3/42221; H04M 3/5166; H04M 3/42042; H04M 3/51; H04M 3/5183; H04M 3/2218; H04M 3/42059; H04M 3/493; H04M 3/523; H04M 3/5231; H04M 3/5232; H04M 3/5175; H04M 1/72522; H04M 2203/256; H04M 3/436; H04M 2201/40; H04M 2203/551; H04M 2201/41; H04M 2203/6027; H04M 2203/6054; H04M 2201/18; H04M 2203/2038; H04M 2203/306; H04M 2203/357; H04M 3/42136; H04M 3/527; H04M 9/001; H04M 2201/39; H04M 2201/60; H04M 2203/2027; H04M 2203/401; H04M 2203/558; H04M 3/42382; H04M 3/4365; H04M 3/4936; H04M 3/5233; H04M 3/533; G06N 20/00; G10L 15/265
See application file for complete search history.

(56) References Cited

U.S. PATENT DOCUMENTS

| 5,463,149 | A  | 10/1995 | Fukumoto et al. |
| 6,885,744 | B2 | 4/2005  | Bluestein et al. |
| 7,123,711 | B1 | 10/2006 | Cope |
| 8,300,558 | B2 | 10/2012 | Buford et al. |
| 8,311,204 | B2 | 11/2012 | Fotta |
| 8,565,408 | B1 | 10/2013 | Bruening et al. |
| 8,634,542 | B2 | 1/2014  | Spottiswoode et al. |
| 9,736,300 | B2 | 8/2017  | Cook |

(Continued)

*Primary Examiner* — Akelaw Teshale
(74) *Attorney, Agent, or Firm* — Hunton Andrews Kurth LLP

(57) ABSTRACT

When a new communication is received at a server, the system can generate machine readable data pertaining to the communication, e.g., a transcript for the communication. Using the transcript, the system can utilize natural language processing techniques to find at least one request in the communication. The system can search summaries of prior communications, and if there is a communication including a similar request, the system can display a record of the prior communication.

16 Claims, 7 Drawing Sheets

(56) References Cited

U.S. PATENT DOCUMENTS

| | | |
|---|---|---|
| 2002/0114432 A1 | 8/2002 | Shaffer |
| 2003/0185379 A1 | 10/2003 | O'Connor et al. |
| 2004/0002865 A1 | 1/2004 | Chan et al. |
| 2004/0032941 A1* | 2/2004 | Graham ............... H04M 3/5166 |
| | | 379/219 |
| 2004/0203629 A1 | 10/2004 | Dezonno et al. |
| 2005/0047394 A1 | 3/2005 | Hodson et al. |
| 2005/0071178 A1 | 3/2005 | Beckstrom et al. |
| 2005/0163299 A1 | 7/2005 | Creamer et al. |
| 2006/0062374 A1 | 3/2006 | Gupta |
| 2006/0203990 A1 | 9/2006 | Cope et al. |
| 2006/0210032 A1 | 9/2006 | Grech et al. |
| 2007/0263803 A1 | 11/2007 | Chan |
| 2008/0084975 A1 | 4/2008 | Schwartz |
| 2009/0232294 A1* | 9/2009 | Xie ..................... H04M 3/5232 |
| | | 379/265.1 |
| 2011/0010173 A1* | 1/2011 | Scott ................. H04M 3/42221 |
| | | 704/235 |
| 2011/0058660 A1 | 3/2011 | Piratla et al. |
| 2012/0051537 A1 | 3/2012 | Chishti et al. |
| 2013/0332536 A1* | 12/2013 | Kho ........................ H04L 61/00 |
| | | 709/205 |
| 2014/0177479 A1 | 6/2014 | Cook |
| 2017/0357636 A1* | 12/2017 | Shafiulla ................ G06Q 30/02 |
| 2018/0020093 A1* | 1/2018 | Bentitou ................. G10L 13/00 |
| 2018/0115645 A1* | 4/2018 | Iyer .......................... G06N 3/08 |

* cited by examiner

METHOD FOR CONVERSION AND CLASSIFICATION OF DATA BASED ON CONTEXT

BACKGROUND

Machine learning uses statistical techniques for teaching computers with data to perform specific tasks without being explicitly programmed to do so. The goal of machine learning is to construct algorithms that can learn from and make predictions on data. These algorithms work by creating mathematical models which can classify data. The process of creating the models can involve training and fine-tuning the model parameters using input data.

Natural language processing ("NLP") is a subfield of computer science, information engineering, and artificial intelligence. NLP is concerned with the interactions between computers and human (natural) languages. In particular, NLP focuses on how to program computers to process and analyze large amounts of natural language data.

SUMMARY

Many enterprises receive large volumes of natural language data. When processing this type of data, one of the main problems is that there is no consistent approach to analyzing and exploiting the data. Additionally, because natural language data is sometimes spoken (as opposed to being written), processing the data presents its own unique set of technical challenges. For example, many enterprises receive customer calls and they store an electronic recording of each call. At the end of each call, the customer care representative can prepare a summary of the call. However, preparing the summary can be time consuming for the customer care representative and resource intensive for the enterprise. Additionally, preparing the call summary can be subjective and this can lead to inconsistencies across the board. Therefore, these summaries have not been very useful in providing objective natural language data.

To make the matters more complicated, recently some enterprises have begun offering chat messaging platforms to their customers. With chat messaging platforms, consumers can communicate with these enterprises electronically, e.g., a customer can chat message with an enterprise instead of calling the enterprise. In certain circumstances, chatting can simplify a customer's interaction with the enterprise. However, chat messaging can create problems for these enterprises. For example, the enterprise has to make sure that it is being consistent in its communication between chat messaging and phone calls, but there is no uniform approach to organizing and classifying these communications. Moreover, because phone calls and chat messages are different modes of communication (e.g., one is spoken and the other is written), solutions offered in prior art have not been able to unify these communications in a way that they can be aggregated and analyzed.

With the advent of machine learning technologies and NLP techniques, there can be new processes for classifying and exploiting natural language data and communication. Therefore, it is an object of this disclosure to describe a system and method for analyzing natural language data collected by a call center (e.g., phone calls and/or chat messages received by the call center). Each communication can be stored in a database in a format which is machine readable. For example, each call can be transcribed and stored in a database as text data. Additionally, the transcript of each chat message can be stored in the database. A NLP module of the system of the present disclosure can create a summary for each communication (or associate an attribute with the communication). The system can prepare the summary or determine the attribute using various keywords used or discussed in the communication. These keywords can indicate which parts of the discussion or communication are important or relevant, e.g., in one embodiment, a problem statement, resolution statement, cause of the problem, or possible solution offered to the problem can be important or relevant in a communication. The system stores this data in the database as data pertaining to prior communications.

Subsequently, when a new communication (e.g., phone call or chat) is received at the call center, the system can generate machine readable data pertaining to the communication. For example, the system can transcribe the call as the conversation is ongoing. Using the transcript of the communication, the system can determine at least one attribute, comment, issue or request discussed by the customer in the new communication. The system can search summaries of prior communications (or attributes thereof), and if there is a communication including a similar attribute, comment, issue or request, the system can display a record of the prior communication. For example, the system can display a summary of the prior communication to the customer care representative. The customer care representative can review the record and respond to the customer consistent with the prior communication.

In one example embodiment, after displaying the record of the prior communication to the representative, the representative can provide input as to whether the prior communication is relevant to the new communication or attribute, comment, issue or request in the new communication. The system can use the representative's input as feedback loop to enhance the quality of searching performed by the system.

In one example embodiment, as a communication is ongoing, the system continuously makes determinations about the ongoing communication and continuously searches for prior communications that are similar to the ongoing communication. For example, the system continuously analyzes an incoming call and determines an attribute for the incoming call at predetermined intervals. If after a few intervals, the system determines that a new attribute can be assigned to the incoming call, the system can search for prior calls which have the same "new" attribute. If as a result of this search a new summary of a prior call can be found, the system will present the new summary to the user. For example, the system can display the new summary in addition to or instead of a summary that was originally displayed to the user.

In one example embodiment, during an incoming communication, the system can assign a plurality of attributes for the incoming communication, e.g., during an incoming call, the system can determine that the caller is complaining about two problems because the caller discusses two problem statements during the calls. In this example embodiment, the system can search for both attributes in prior communications and display prior communications responsive to each of the attributes.

DETAILED DESCRIPTION

Figure 1:
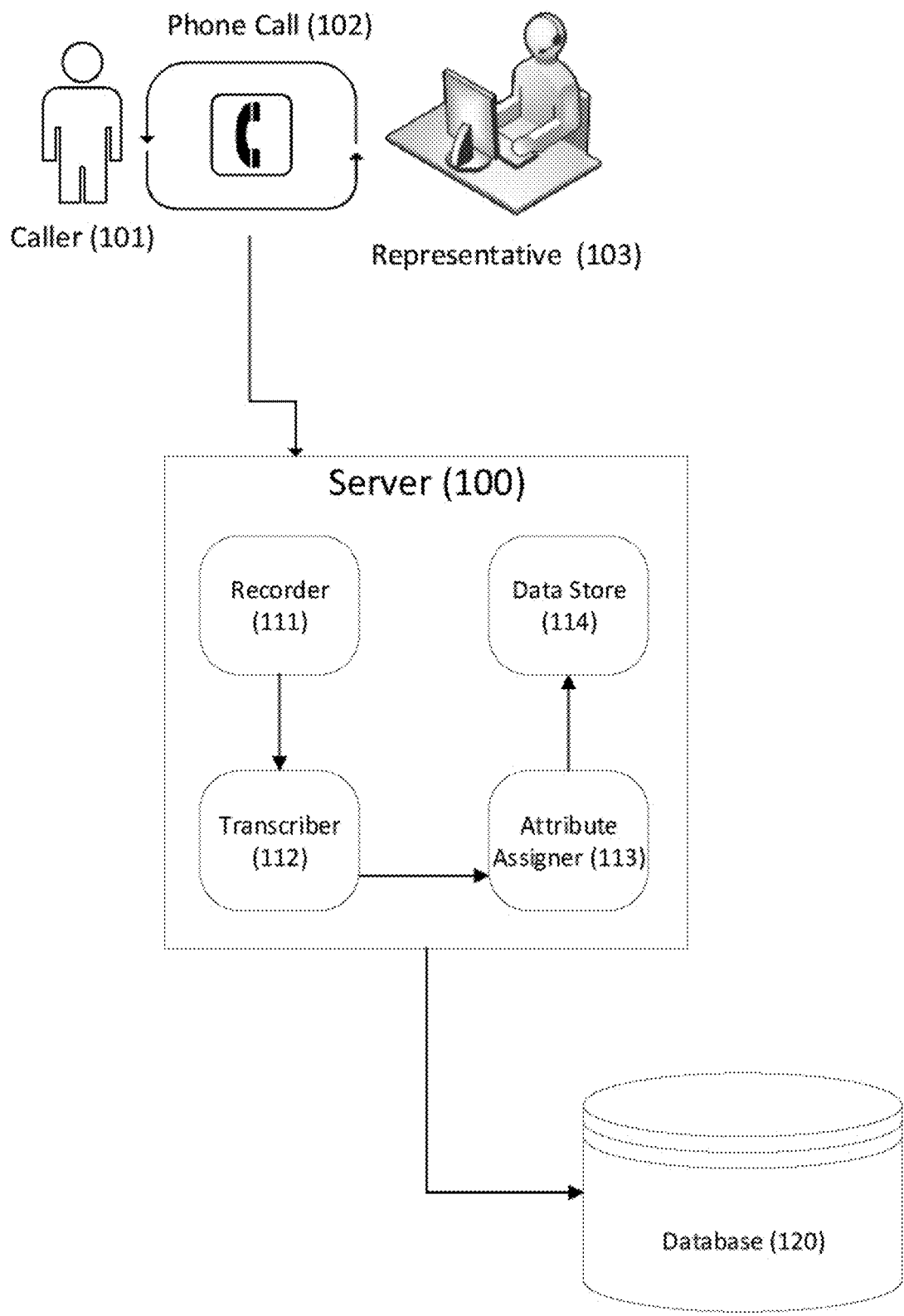
FIG. 1 shows an example system for collecting natural language data at a server of a service provider.

Generate a Database Including Natural Language Data

In one example embodiment, a service provider can receive various types of communications including natural language data. For example, a service provider can receive a plurality of calls from a plurality of callers. Each caller can discuss at least one request or issue during the call. A server of the service provider can record and analyze the calls as the calls are ongoing. A database of the server can store a record for each call. For example, the record can be a file, folder, media file, or document, and include information such as a time for an incoming call, a phone number from which the call was made, a request discussed during the call, an account to which the call pertained, etc. Additionally, the database can store a voice recording for each call. The voice recording can be stored in or in association with the record for each call. The server can generate a dataset containing information about all or some of the calls received by the service provider. For example, the dataset can include an identification number for each call, a call transcript, a phone number associated with the call, a time of the call, one or more requests discussed during the call, and an account number associated with the caller.

The server can include a transcription module, which can generate a transcript for each call and store the transcript in the database. For example, the transcription module can divide a digital recording into small segments. The transcription module then matches these segments to known phonemes (i.e., the smallest element of a language) or words in the appropriate language. Next, the transcription module examines phonemes (or words) in the context of the other phonemes (or words) around them. For example, the transcription module runs the contextual phoneme plot through a complex statistical model and compares them to a large library of known words, phrases and sentences. The transcription module then determines what the caller was saying and outputs it as text. In one embodiment, the transcription module can add the transcript of each call to the dataset. The transcription module can also store the transcript in or in association with the record for each respective call. In one embodiment, the transcription module can transcribe incoming calls as they take place. In another embodiment, the transcription module can transcribe past call recordings.

In one example embodiment, the server can receive a plurality of chat messages. The server of the service provider can store and analyze these messages. A database of the server can store a record for each chat message. The server can generate a dataset containing information about all or some of the chat messages received by the service provider.

Generate a Summary of Each Call or Chat Message

In one example embodiment, one or more people can summarize each communication received by the enterprise. For example, when a caller calls the service provider, a representative of the service provider speaks with the caller and the representative determines one or more requests discussed by the caller during the call. The representative can generate or modify the record for the call to indicate the caller's one or more requests. These requests can be stored as, e.g., problem statements for the call or a summary for the call. The record can be stored in the database of the server. The server can access the record to update or generate the dataset. For example, in the dataset and in association with the call (or the identification number for the call), the server can store an entry indicating the caller's one or more requests.

In one example embodiment, the server can include an intent recognition module, which can analyze the transcript for a communication (e.g., phone call or a chat message) and determine a summary for the communication, e.g., at least one or more requests discussed during the communication. In some embodiments, the intent recognition module can identify other aspects of a communication, e.g., a problem statement, a cause of the problem, a solution to the problem, a resolution for the problem or a closing statement for the communication. The intent recognition module can add these aspects of the communication to the record for the communication. This information can be stored, e.g., as a part of the summary of the communication.

For example, the intent recognition module can use intent classification techniques. Intent classification can be a natural language understanding ("NLU") task that can understand at a high level what the user's intent is in a conversation, and thus, what request the user is intending to make during the call. The intent recognition module can determine the intent using hard-coded rules with regular expression (i.e., scanning the words). The intent recognition module can also determine the intent by training a supervised machine learning classification model on labeled data. Many machine-learning models can be used for this purpose, e.g., a neural network, deep neural network, a recurrent neural net such as LSTM, decision tree-based methods like random forest or gradient boosted machines, support vector machine, logistic regression, etc. The intent recognition module can also include some preprocessing modules to convert text into character, word, or sentence embeddings that can be fed into the model. Basic preprocessing can include stemming or lemmatization, sentence or word tokenization, stopword removal, etc. This can include a term frequency based approach, including TF-IDF, or Word2Vec, Universal Sentence Encoder, etc. Part of the NLU can also include dependency parsing to try to capture negation, or sentiment analysis.

Once the intent recognition module determines the intent of the communication, the intent recognition module can determine a request associated with the intent. This can involve named entity recognition ("NER"). NER can be implemented with regular expressions, word embedding or more complicated statistical models. The intent recognition module can generate or modify the record for the communication to indicate the caller's one or more requests. These requests can be stored as problem statements in the record for the communication. The record can be stored in the database of the server. The server can access the record to update or generate the dataset.

In one example embodiment, the intent recognition module can determine that the caller is making a request for, e.g., an account level change, a change of address, telephone number or email address, a new credit card, a copy of a monthly statement, a malfunctioning card, a replacement card, etc. The intent recognition module can store this information in the call record (e.g., as a problem statement) and the server can update the dataset to indicate the caller's request, e.g., an account level change.

In one example embodiment, the intent recognition module can recognize other natural language data discussed in a communication, e.g., a cause for the caller's problem, a solution to the problem, a resolution for the problem or a conclusion for the call. For each one of these comments, the intent recognition module can assign a value or description to the record for the communication. For example, the intent recognition module can assign one or more of the following as a resolution statement for a call, e.g., the caller's issue was resolved, was partially resolved, was not resolved, requires a follow up, requires escalation, etc. The intent recognition module can add the resolution statement to the record for each call.

In one example embodiment, the intent recognition module can determine which parts of the transcript of a communication are important, e.g., relate to a problem statement, a cause for the caller's problem, a solution to the problem, a resolution for the problem or a conclusion for the call. For example, important parts of the transcript for a phone call or a chat message can include the problem statement, resolution statement, etc. In one example embodiment, the intent recognition module can use NLP techniques such as Latent Dirichlet Allocation, bag of words combined with a supervised learning technique, keyword search, or neural network techniques to determine the important parts of the transcript. In one example embodiment, for each part of the transcript that is important, the intent recognition module can assign that part to a category. For example, there can be various categories for problems for which customers call, e.g., credit card, bank account, online login, etc. The intent recognition module can assign the important parts of the transcript, e.g., the problem statement, to these categories. For example, for a call relating to a lost credit card, the intent recognition module can determine that the problem statement includes the keywords "lost" and "credit card." Based on these keywords, the intent recognition module can assign the problem statement to the category of credit card problems, and under the credit card problems, the intent recognition module can assign the call to the subcategory of lost cards.

In one example embodiment, the intent recognition module can use a keyword search technique to identify important parts of a transcript. For example, for identifying the problem statement, the intent recognition module can look for terms or keywords such as "problem," "issue," "reason for your call," "help," etc. These terms and keywords can be the terms and keywords that callers are most likely to use when they call regarding, e.g., a problem. If these keywords (or a combination thereof) are present in a part of a transcript, the intent recognition module can determine that this part of the transcript is the problem statement.

In one example embodiment, a communication summary can include other information about the communication. For example, a call summary can include a date for the call, duration of the call, name of the caller, the account number of the caller, the phone number used to make the call, etc. As another example, a chat message summary can include a date for the chat, name of the chatter, the account number of the chatter, etc.

After receiving the communications discussed above, the server can store records pertaining to each communication in the database. These records can be stored in the form of a dataset including all or some of the records. These records and/or the dataset can be searchable by the server.

FIG. 1 shows an example system for collecting natural language data at a server of a service provider. In this example embodiment, the natural language data can be provided in a phone call 102 between a caller 101 and a representative 103. A server 100 can listen to the conversation and record the conversation using a recorder module 111. For example the recorder module 111 can generate an electronic recording of the call while the conversation is ongoing. The electronic recording can be stored in the database 120. Subsequently, a transcriber module 112 can access the electronic recording and transcribe the call to generate a text file in association with the electronic file. The text file can be stored in association with the electronic recording in the database 120. Then the attribute assigner 113 can access the text file and assign one or more attributes to the text file. The attributes can be, e.g., a request made during the call. The attributes can be stored in association with the electronic recording in the database 120. Lastly, some or all of the data stored in the database 120 can be stored in a data store 114 for ease of access and further manipulation.

Figure 2:
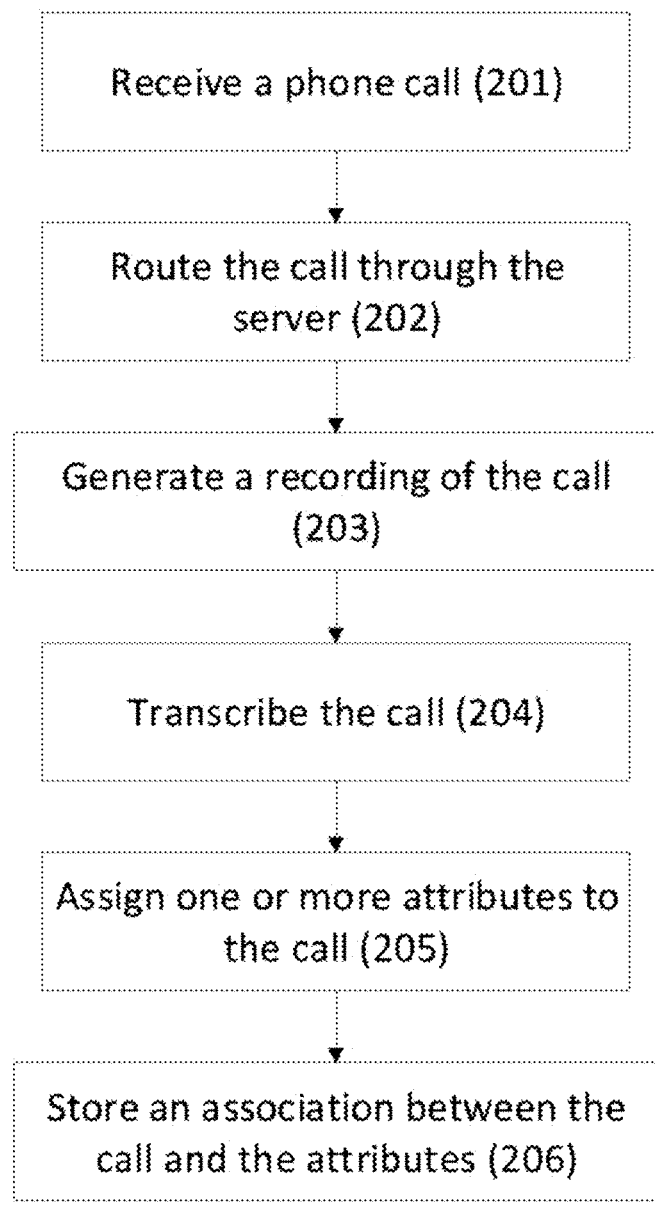
FIG. 2 shows an example flow chart for collecting natural language data in chat messaging.

FIG. 2 shows an example flow chart for collecting natural language data in chat messaging. In this example embodiment, in step 201 an enterprise receives a call at a call center. In step 202, the enterprise routes the call through a server for processing. In step 203, a recorder module of the server records the call. In step 204, a transcriber module of the server generates a transcript of the call. In step 205, an attribute assignor module of the server assigns one or more attributes to the call. In step 206, an association with be generated between the call recording and the attributes and the server stores the association in a data store for future access and evaluation.

The Chatbot

In one example embodiment, a server of a service provider can provide a chatbot as part of a chat messaging platform, and the server can store records pertaining to chat messages received or handled by the chatbot. A chatbot (also known as a smartbot, talkbot, chatterbot, Bot, IM bot, interactive agent, Conversational interface or Artificial Conversational Entity) can be a computer program or an artificial intelligence which conducts a conversation via auditory or textual methods. A chatbot can provide a conversational experience for interaction with users. In one example, a user can ask a question, the chatbot can interpret the question and then provide an answer. In another example, a chatbot can ask a question or ask a user to provide certain information to the chatbot. The user can provide a response to the chatbot which can classify the information in the response, and act according to the information. A chatbot can be used in a dialog system for various purposes, e.g., customer service or information acquisition.

In an example embodiment, the server can include a chatbot. A customer can interact with an enterprise through a chatbot. The chatbot can use NLP techniques. For example, the chatbot can use intent classification techniques to understand what the user asks the chatbot. The server can also include some preprocessing modules to convert text into character, word, or sentence embeddings that can be fed into the chatbot. Basic preprocessing can include stemming or lemmatization, sentence or word tokenization, stopword removal, etc. This can include a term frequency based approach, including TF-IDF, or Word2Vec, Universal Sentence Encoder, etc. Part of the NLU can also include dependency parsing to try to capture negation, or sentiment analysis.

Once the chatbot knows the intent of the conversation (e.g., account update when the caller asks the chatbot to change the address associated with an account), the chatbot can perform a task associated with the intent. This can involve named entity recognition ("NER") to extract the specific information that the chatbot needs to fulfill the request. If the chatbot does not find the information it needs, the chatbot can ask further questions to get the required information. NER can be implemented with regular expressions or more complicated statistical models.

In one example embodiment, after interacting with the chatbot for a few minutes, a customer can ask for a real person or representative to chat with the customer. For example, when the chatbot is unable to understand or assist the customer, the customer asks for a real representative. When a real representative takes over the conversation or chat, the intent recognition module can review a transcript of the chat messaging with the chatbot. The intent classification module can determine a summary of the conversation, e.g., problem statement, and based on the summary, the intent classification module can determine if there is a previous phone call or chat messaging by the customer about the same or similar issues. If so, the system can display a record of the past communication to the representative. The record can include a summary of the previous communication.

Figure 3:
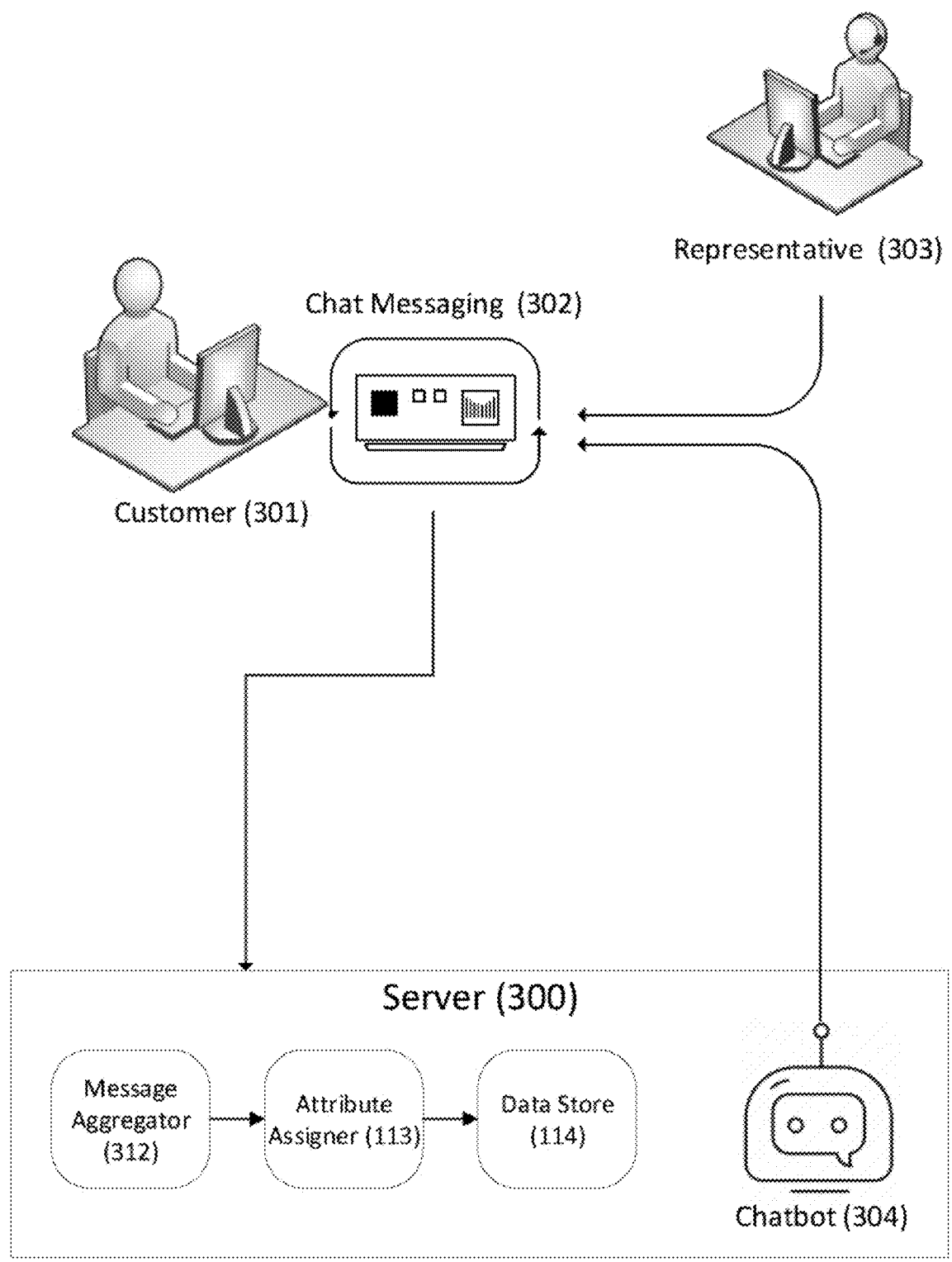
FIG. 3 shows another example system for collecting natural language data at a server of a service provider.

FIG. 3 shows another example system for collecting natural language data at a server of a service provider. In this example embodiment, an enterprise offers chat messaging 302 for communication with a customer 301. The customer 301 can chat with a representative 303 or a chatbot 304, which can operate on a server 300. In each case, the chat messaging 302 can be routed through the server 300, which can include a message aggregator 312 for gathering the messages exchanged between the customer 301 and the representative 303 or the chatbot 304. The attribute assignor 113 can analyze the messages and assign one or more attributes to the chat messages. The attribute assignor 113 can store the chat messages and the attributes for the messages in the data store 114. The attribute assignor 113 can store associations between chat messages and the respective attributes in the data store 114.

Classification of an Incoming Call or Chat

In one example embodiment, a service provider receives an incoming communication (e.g., phone call or chat message). The incoming communication can be routed through a server of the service provider. The server can include the transcription module and the intent recognition module. The server (e.g., the transcription module) can convert the incoming communication into a machine readable format and the server (e.g., the intent recognition module) can determine a summary for the communication as it is received by the server.

For example, as the incoming call progresses, the server can record the call and the transcription module can prepare a transcript of the call (or a transcript-in-progress for the call). The transcription module can provide the transcript (or segments of the transcript) to the intent recognition module, which can detect important parts of the transcript. For example, if during the first minute of the call the caller explains the problem that the caller is calling about, the intent recognition module can determine the problem statement for the call.

In one example embodiment, the server can include a comparison module. The comparison module can access the database of the server and compare an attribute of the incoming communication to records of prior communications stored in the database. The attribute of the incoming communication can be, e.g., a problem statement, a resolution statement, a cause of the problem, etc. For example, the comparison module can compare the problem statement of an incoming call and compare it to problem statements of past calls for the same user. If there is a match, the comparison module can identify and display the records of past calls which match the attribute of the incoming call. If there is no match, the cycle will repeat. In other words, the transcription module will continue to listen to the conversation and transcribe the call. The intent recognition module will continue to ascertain important parts or attributes of the call (or transcript of the call). The intent recognition module can provide those parts or attributes to the comparison module, which can search for past calls including records matching the attributes.

In one example embodiment, after identifying the past call including a relevant record, the server can display a summary of the past call to the representative. For example, a customer calls a bank to seek a replacement credit card. The intent recognition module can determine that the caller's intent is to obtain a replacement credit card. The intent recognition module can transmit this intent to the comparison module, which can search for past calls by the same caller inquiring about the same issue. The comparison module can find a record of a past call dealing with the same issue. The server can send the record to the representative, who can see the record on his computer. The record can include a summary of the call, which can include, e.g., a problem statement, a resolution for the problem, a solution offered, a time when the call was made, the name of the person making the call, etc. In one embodiment, the server can display a transcript of the call or the relevant parts of the transcript of the call to the representative. The relevant parts of the transcript can include important parts of the transcript, e.g., parts relating to the problem statement, the resolution for the problem, the solution offered, etc.

In one example embodiment, after the comparison module determines that there is no match in the database, the cycle will immediately repeat. In another example embodiment, the cycle will repeat only after passage of a certain period of time, e.g., 5-10 minutes. In yet another example embodiment, the cycle will repeat after a period of time determined by the representative. For example after displaying a matched call or failing to find a matched call, the representative can be prompted to select a time for repeating the cycle.

In one example embodiment, after a record of a past communication is displayed to the representative, the representative can provide feedback for the record. For example, the representative can enter an input indicating how relevant the record was to the issues discussed in the new communication. This feedback can be provided to the intent recognition module as feedback loop to improve the module. For example, the intent recognition module can use this feedback to enhance its machine learning technique.

In one example embodiment, the record for a past communication can include the name of the representative who responded to the communication, e.g., the name of the customer care representative who took the call. If an incoming communication is related to the past communication, the representative can display the contact information for the representative who responded to the communication the first time. In one embodiment, the server can transfer the call to the same representative.

In one example embodiment, when an incoming communication is in progress, a comparison module can search for records pertaining to the account number of the customer who initiates the communication, e.g., during a phone call, the comparison module can search for records pertaining to the account number of the caller. In another example embodiment, the comparison module can search for records pertaining to more than one customer, e.g., the comparison module can search the records pertaining to the caller and other callers.

Figure 4:
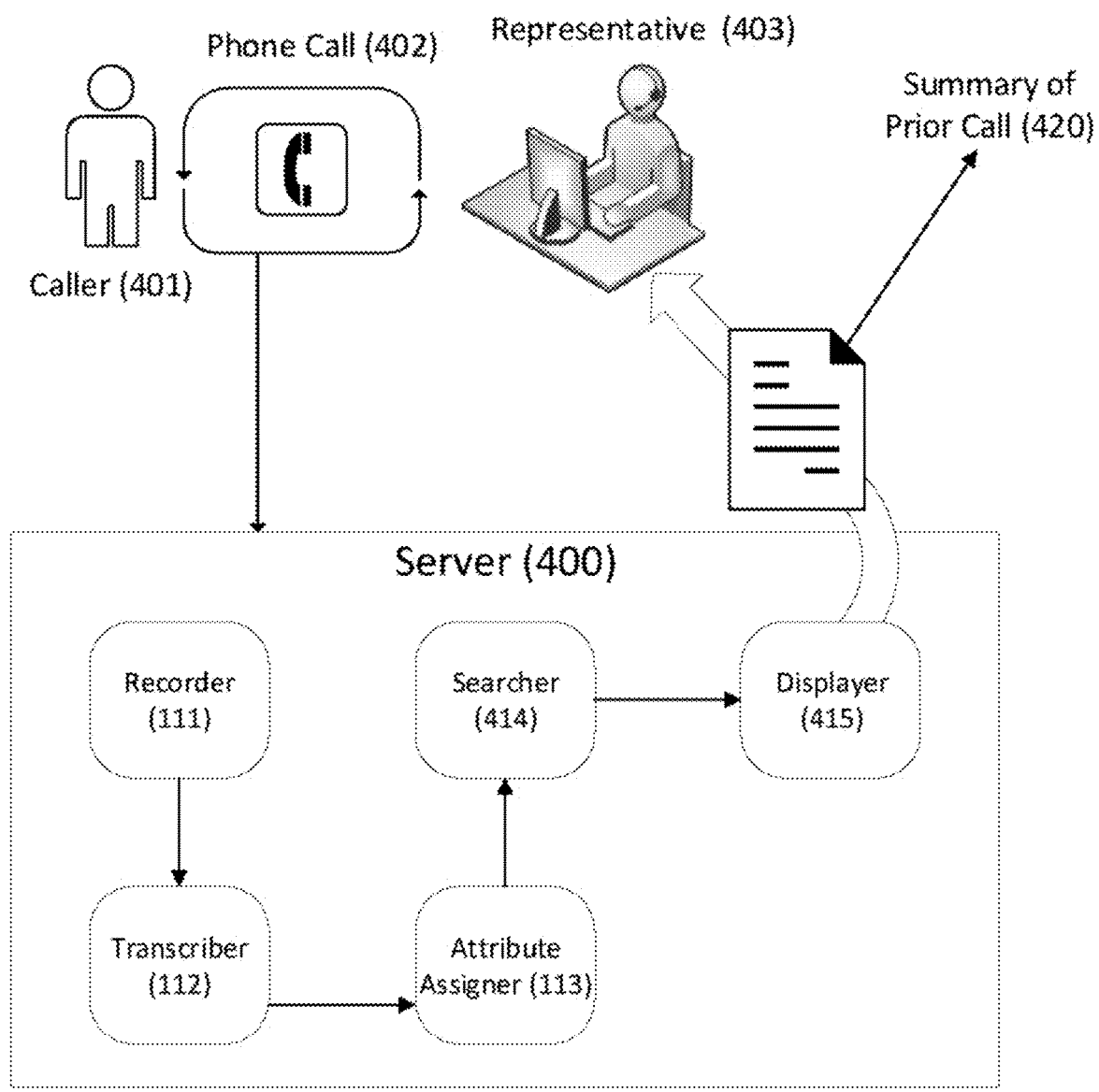
FIG. 4 shows an example system for displaying information relevant to an incoming communication.

FIG. 4 shows an example system for displaying information relevant to an incoming communication. In this example embodiment, a caller 401 makes a phone call 402 to an enterprise. The phone call 402 is answered by a representative 403. The enterprise can route the phone call 402 through a server 400 which can include a recorder module 111 for recording the call. The server 400 can also include a transcriber module 112 for generating a transcript of the phone call 402. The attribute assigner module 113 of the server 400, using a natural language processing technique, can assign one or more attributes to the phone call 402. The server 400 can include a searcher module 414, which can search the data store 114 for prior calls including the same attributes as the phone call 402. If the searcher module 414 finds a responsive prior call, a displayer module 415 can display a summary of the prior call 420 to the representative 403.

Merging the Records

In one example embodiment, if the comparison module finds more than one record (or past communication) relating to an attribute of an incoming communication, the comparison module can link the records (or past communications) to each other. As such, if the comparison module executes a search and the search returns one of the records, the comparison module will transmit both records to the representative.

In one example embodiment, if the comparison module finds more than one record (or past communication) relating to an attribute of an incoming communication, the comparison module can merge the records (or past communications). In one example embodiment, when two records are merged, the records can be fed to the intent recognition module as one record. The intent recognition module can create an overall summary for the merged record.

In one example embodiment, the intent recognition module can merge only the relevant part of each record. For example, if a first record includes two problem statements and a second record includes only one problem statement, the intent recognition module can merge only the parts of the first record which includes the relevant problem statement to the problem statement of the second record.

Example Embodiment

Figure 5:
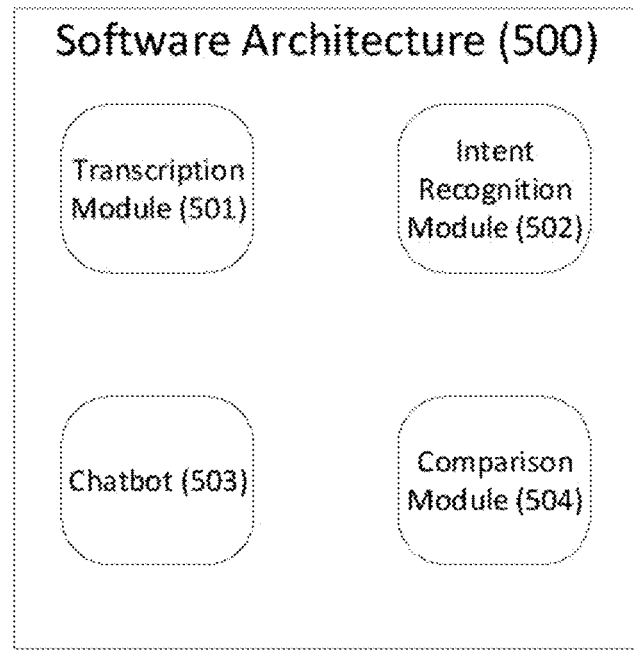
FIG. 5 shows an example software architecture for a server including the modules pertinent to the system of the present disclosure.

FIG. 5 shows an example software architecture 500 for a server including the modules pertinent to the system of the present disclosure. In this example embodiment, the server can include a transcription module 501, an intent recognition module 502, a chatbot 503, and a comparison module 504. The transcription module 501 can transcribe incoming calls. The intent recognition module 502 can identify the relevant parts of each phone call. The chatbot 503 can receive chat messages from the user and respond to them. The comparison module 504 can identify an attribute in an incoming call and find a record of a prior call including the attribute.

Figure 6:
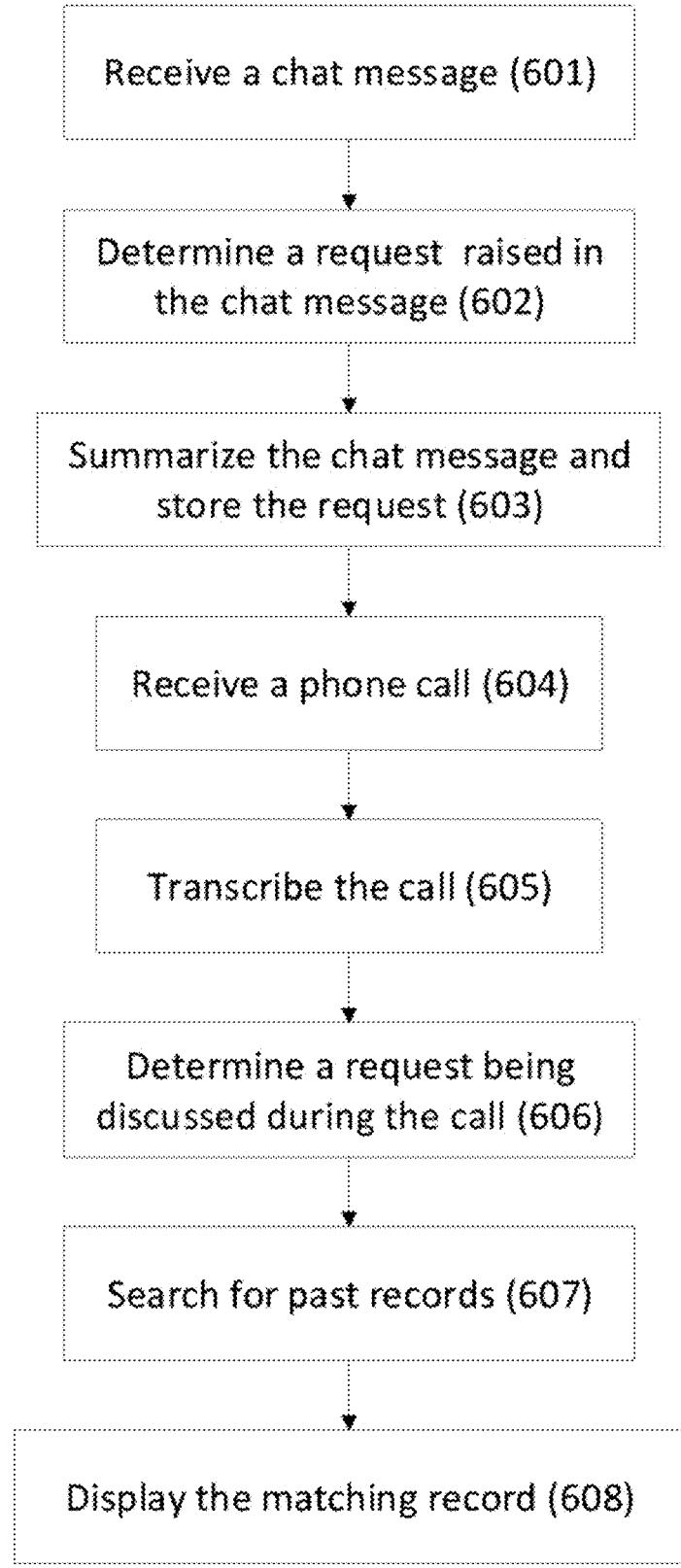
FIG. 6 shows an example flow chart describing the steps of a method according to the present disclosure.

FIG. 6 shows an example flow chart describing the steps of a method according to the present disclosure. In this example embodiment, in step 601, a server of the service provider receives a chat message from a customer. In step 602, an intent recognition module of the server determines a request discussed in the chat message. In step 603, the intent recognition module generates a summary of the chat message and stores the request as a record for the chat message. In step 604, the customer calls the service provider again. In step 605, a transcription module of the server transcribes the call. In step 606, the intent recognition module determines a request being discussed during the call. In step 607, a comparison module of the server searches for past records including the request. In step 608, the comparison module displays the record and summary of the past chat to the customer service representative.

Benefits of the System

The system of the present disclosure can provide data to evaluate performance of customer care representatives. For example, the data can identify the representatives which receive callbacks more than average. Additionally, the data can identify areas which the representative has poor performance. Moreover, the data can identify areas which the representatives in general receive most callbacks, and thus, it can identify the areas which are the most problematic for an enterprise.

Technical Implementation of the Server

Figure 7:
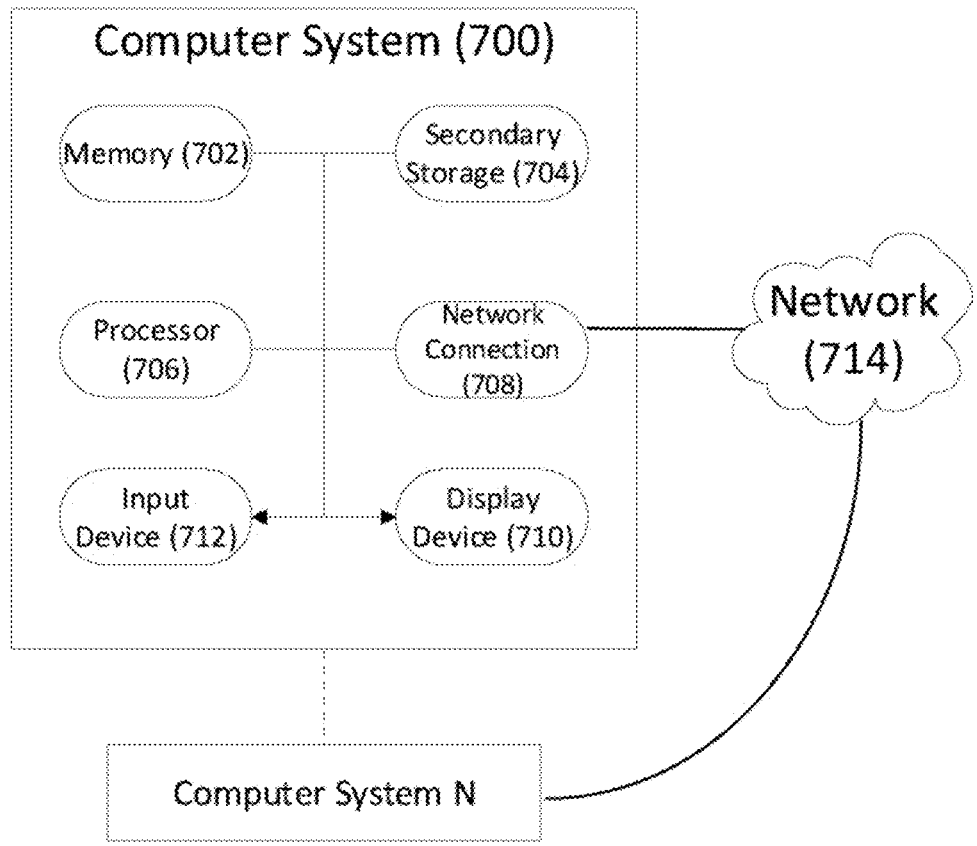
FIG. 7 illustrates exemplary hardware components for a server.

FIG. 7 illustrates exemplary hardware components of a server. A computer system 700, or other computer systems similarly configured, may include and execute one or more subsystem components to perform functions described herein, including the steps of various flow processes described above. Likewise, a mobile device, a cell phone, a smartphone, a laptop, a desktop, a notebook, a tablet, a wearable device, a server, etc., which includes some of the same components of the computer system 700, may run an application (or software) and perform the steps and functionalities described above. Computer system 700 may connect to a network 714, e.g., Internet, or other network, to receive inquiries, obtain data, and transmit information and incentives as described above.

The computer system 700 typically includes a memory 702, a secondary storage device 704, and a processor 706. The computer system 700 may also include a plurality of processors 706 and be configured as a plurality of, e.g., bladed servers, or other known server configurations. The computer system 700 may also include a network connection device 708, a display device 710, and an input device 712.

The memory 702 may include RAM or similar types of memory, and it may store one or more applications for execution by processor 706. Secondary storage device 704 may include a hard disk drive, floppy disk drive, CD-ROM drive, or other types of non-volatile data storage. Processor 706 executes the application(s), such as those described herein, which are stored in memory 702 or secondary storage 704, or received from the Internet or other network 714. The processing by processor 706 may be implemented in software, such as software modules, for execution by computers or other machines. These applications preferably include instructions executable to perform the system and subsystem component functions and methods described above and illustrated in the FIGS. herein. The applications preferably provide graphical user interfaces (GUIs) through which users may view and interact with subsystem components.

The computer system 700 may store one or more database structures in the secondary storage 704, for example, for storing and maintaining the information necessary to perform the above-described functions. Alternatively, such information may be in storage devices separate from these components.

Also, as noted, processor 706 may execute one or more software applications to provide the functions described in this specification, specifically to execute and perform the steps and functions in the process flows described above. Such processes may be implemented in software, such as software modules, for execution by computers or other machines. The GUIs may be formatted, for example, as web pages in HyperText Markup Language (HTML), Extensible Markup Language (XML) or in any other suitable form for presentation on a display device depending upon applications used by users to interact with the computer system 700.

The input device 712 may include any device for entering information into the computer system 700, such as a touchscreen, keyboard, mouse, cursor-control device, microphone, digital camera, video recorder or camcorder. The input and output device 712 may be used to enter information into GUIs during performance of the methods described above. The display device 710 may include any type of device for presenting visual information such as, for example, a computer monitor or flat-screen display (or mobile device screen). The display device 710 may display the GUIs and/or output from sub-system components (or software).

Examples of the computer system 700 include dedicated server computers, such as bladed servers, personal computers, laptop computers, notebook computers, palm top computers, network computers, mobile devices, or any processor-controlled device capable of executing a web browser or other type of application for interacting with the system.

Although only one computer system 700 is shown in detail, system 700 may use multiple computer systems or servers as necessary or desired to support the users and may also use back-up or redundant servers to prevent network downtime in the event of a failure of a particular server. In addition, although computer system 700 is depicted with various components, one skilled in the art will appreciate that the system can contain additional or different components. In addition, although aspects of an implementation consistent with the above are described as being stored in a memory, one skilled in the art will appreciate that these aspects can also be stored on or read from other types of computer program products or computer-readable media, such as secondary storage devices, including hard disks, floppy disks, or CD-ROM; or other forms of RAM or ROM. The computer-readable media may include instructions for controlling the computer system 700, to perform a particular method, such as methods described above.

The present disclosure is not to be limited in terms of the particular embodiments described in this application, which are intended as illustrations of various aspects. Many modifications and variations can be made without departing from its spirit and scope, as may be apparent. Functionally equivalent methods and apparatuses within the scope of the disclosure, in addition to those enumerated herein, may be apparent from the foregoing representative descriptions. Such modifications and variations are intended to fall within the scope of the appended representative claims. The present disclosure is to be limited only by the terms of the appended representative claims, along with the full scope of equivalents to which such representative claims are entitled. It is also to be understood that the terminology used herein is for the purpose of describing particular embodiments only, and is not intended to be limiting.

What is claimed is:

1. A method comprising:
    receiving a first phone call;
    transcribing the first phone call to create a first transcript;
    performing a natural language processing technique to determine a first discussion attribute of the first transcript;
    associating the first transcript with a first discussion attribute label selected from a group of labels including a plurality of discussion attribute labels;
    receiving a second phone call;
    transcribing the second phone call to create a second transcript;
    performing the natural language processing technique to determine a second discussion attribute of the second call;
    associating the second transcript with a second discussion attribute label selected from the group of labels;
    comparing the first discussion attribute label to the second discussion attribute label;
    in response to a determination that the first discussion attribute label matches the second discussion attribute label, displaying a report of the first transcript to a recipient of the second call, wherein the report of the first transcript includes a summary of the first transcript;
    searching a database including a plurality of transcripts, each transcript being associated with at least one discussion attribute label, wherein during the search, the second discussion attribute label is compared to the discussion attribute label of each of a subset of the plurality of transcripts;
    selecting at least one of the plurality of transcripts which is associated with the discussion attribute label that matches the second discussion attribute label;
    combining the report of the first transcript with a report of a selected transcript to create a combined report; and
    displaying the combined report to the user.

2. The method of claim 1, further comprising:
    performing the natural language processing technique to determine a third discussion attribute of the second call;
    associating the second transcript with a third discussion attribute label selected from the group of labels;
    searching the database, wherein during the search, the third discussion attribute label is compared to the discussion attribute label of the plurality of transcripts;
    in response to a determination that the discussion attribute label of one of the plurality of transcripts matches the third discussion attribute label, displaying a report of the one of the plurality of transcripts to the recipient of the second call.

3. The method of claim 1, further comprising:
    performing the natural language processing technique to determine another discussion attribute of the second call;
    if the other discussion attribute of the second call matches the second discussion attribute of the second call, continue displaying the report of the first transcript to the recipient of the second call;
    if the other discussion attribute of the second call does not match the second discussion attribute of the second call:
        associating the second transcript with the other discussion attribute label selected from the group of labels;
        searching the database, wherein during the search, the other discussion attribute label is compared to the discussion attribute label of the plurality of transcripts;
        in response to a determination that the discussion attribute label of one of the plurality of transcripts matches the other discussion attribute label, display a report of the one of the plurality of transcripts to the recipient of the second call instead of the report of the first transcript.

4. The method of claim 1, wherein the combined report includes a problem statement from the first transcript and a problem statement from the selected transcript.

5. The method of claim 4, further comprising:
displaying a feedback prompt to the user regarding a quality of the combined report.

6. The method of claim 5, further comprising:
storing the feedback in a database including a plurality of feedbacks relating to combined reports.

7. The method of claim 6, further comprising:
training the machine learning model using the plurality of feedbacks as training data.

8. The method of claim 1, wherein the combined report includes the summary from the first transcript and a summary from the selected transcript.

9. The method of claim 1, wherein the combined report includes a duration from the first transcript and a duration from the selected transcript.

10. The method of claim 1, wherein the combined report includes an identity of a caller from the first transcript and an identity of a caller from the selected transcript.

11. The method of claim 1, wherein the natural language processing technique uses a machine learning model.

12. The method of claim 1, wherein the first discussion attribute is a statement of a problem.

13. The method of claim 1, wherein the report of the first transcript includes a duration of the call.

14. The method of claim 1, wherein the report of the first transcript includes an identity of a participant in the call.

15. The method of claim 1, wherein the report of the first transcript includes a statement of the problem.

16. The method of claim 1, wherein a plurality of discussion attributes are associated with the first discussion attribute label.

\* \* \* \* \*